US007136937B2

(12) United States Patent
Teicher (10) Patent No.: US 7,136,937 B2
(45) Date of Patent: Nov. 14, 2006

(54) CONTACT AND CONTACTLESS INTERFACE STORAGE DEVICE WITH PROCESSOR

(75) Inventor: Mordechai Teicher, Hod-Hasharon (IL)

(73) Assignee: m systems Ltd., Kfar Saba (IL)

( * ) Notice: Subject to any disclaimer, the term of this patent is extended or adjusted under 35 U.S.C. 154(b) by 0 days.

(21) Appl. No.: 11/053,881

(22) Filed: Feb. 10, 2005

(65) Prior Publication Data

US 2005/0157568 A1   Jul. 21, 2005

Related U.S. Application Data

(63) Continuation-in-part of application No. 10/627,694, filed on Jul. 28, 2003, now Pat. No. 6,922,734.

(60) Provisional application No. 60/473,560, filed on May 25, 2003.

(51) Int. Cl.
*G06F 3/00* (2006.01)
*G06F 13/00* (2006.01)
*G06F 12/00* (2006.01)

(52) U.S. Cl. ................. 710/1; 710/8; 710/13; 710/106; 710/301

(58) Field of Classification Search .............. 710/8, 710/13, 106, 301
See application file for complete search history.

(56) References Cited

U.S. PATENT DOCUMENTS 6,405,278 B1 *   6/2002   Liepe ................. 711/103
6,681,287 B1 *   1/2004   Chan .................. 711/104
6,704,608 B1 *   3/2004   Azuma ................. 700/66
2001/0005840 A1 *   6/2001   Verkama ............... 705/67
2003/0074179 A1 *   4/2003   Ropo et al. ............ 703/27
2003/0102380 A1       6/2003   Spencer
2004/0196375 A1 * 10/2004   Marshall ............ 348/207.1
2004/0236899 A1      11/2004   Teicher
2004/0255081 A1 * 12/2004   Arnouse ............... 711/115
2005/0015540 A1 *   1/2005   Tsai et al. ............ 711/103

FOREIGN PATENT DOCUMENTS

DE         20208316        9/2002
EP         1102172         5/2001

* cited by examiner

*Primary Examiner*—Kim Huynh
*Assistant Examiner*—Scott Sun
(74) *Attorney, Agent, or Firm*—Mark M. Friedman (57) ABSTRACT

An integrated storage device for transferring data between a remote base station and an appliance, includes a non-volatile storage device configured for storing the data, an antenna and a processor arrangement. The antenna is configured for wirelessly receiving electrical energy from the remote base station in order to power the non-volatile storage device. The antenna is also configured for transferring the data between the remote base station and the non-volatile storage device. The processor arrangement is permanently operationally connected to the non-volatile storage device. The processor arrangement is configured to manage data transfer between the non-volatile storage device and the appliance when the processor arrangement is electrically connected to a power supply via a wired power link.

22 Claims, 6 Drawing Sheets

CONTACT AND CONTACTLESS INTERFACE STORAGE DEVICE WITH PROCESSOR

This application is a CIP and claims priority from U.S. application Ser. No. 10/627,694 filed Jul. 28, 2003, now U.S. Pat. No. 6,922,734, issued Jul. 26, 2005, which in turn claims priority from U.S. Provisional Application Ser. No. 60/473,560 filed on May 25, 2003.

FIELD AND BACKGROUND OF THE INVENTION

The present invention relates to storage media and, in particular, it concerns non-volatile storage media that are accessible wirelessly.

By way of introduction, non-volatile storage devices are widely used in a wide variety of applications. Non-volatile storage devices include all read-write digital storage devices that retain their content when power is disconnected. Non-volatile storage devices include magnetic disks, writable optical disks, and non-volatile solid-state devices such as flash disks. From an application viewpoint, non-volatile storage devices can be categorized into three groups. The first group includes embedded storage devices, wherein the storage device is a permanent part of an electronic appliance such as a cellular telephone or a computer. The second group includes removable storage devices, wherein the storage device is easily inserted into and removed from an electronic appliance, such as, a memory card of a digital camera. The last group includes portable storage devices, wherein the storage device is a stand-alone device that can be selectively connected to appliances, for example a USB flash disk. In all three groups the non-volatile storage devices are sometimes disconnected from a power source. For example, a new cellular telephone is customarily supplied boxed with its battery disconnected from the cellular phone, a flash card of a digital camera is often removed from the camera, and a portable USB flash disk is energized only when connected to a USB port of an appliance. In all these examples, the non-volatile storage device maintains the data stored therein after power is disconnected therefrom, but the non-volatile storage device cannot be accessed to read therefrom or write thereto unless the non-volatile storage device is physically connected to a power source.

Contactless smart cards are an example of an exceptional case whereby a non-volatile memory can be accessed without the non-volatile memory being physically connected to a power source. Each contactless smart card includes a small antenna. When positioned in the proximity of a compatible base station, the antenna of the card receives sufficient electrical energy to operate the card's circuitry. The same antenna is also used to establish a wireless communication link between the contactless smart card and the base station. The wireless communication link enables the base station to read from, and in some models also write to, the smart card's non-volatile memory. This technology is applied in a variety of ways including credit-card-like plastics and key fobs. The main applications of contactless smart cards are high-speed identification and value transactions in mass transit and parking. Due to the very limited energy supply, on the one hand, and the requirement for high transaction speed, on the other hand, the amount of writable non-volatile memory in contactless smart cards is very small, with current typical memory values up to four kilobytes of EEPROM.

Dual smart cards provide both contactless and contact interfaces, whereby the smart card receives data wirelessly and transfers the data via a wired link to an appliance. Dual smart cards typically have two shortcomings. First, the non-volatile memory in dual smart cards is still very small. Second, the dual smart cards are only able to transfer data via the wired link to the appliance if a specialized card reader is disposed between the smart card and the appliance.

Thus, presently there are two types of non-volatile memories. The first type being memories with large capacities, typically in the range of Megabytes to Gigabytes. These memories require physical electrical connection for the memory to be accessed. The second type being contactless cards having small amounts of non-volatile memory, up to a few kilobytes.

A system and method for writing data onto a non-volatile memory, having a large capacity, when the non-volatile memory is not physically electrically connected to a power supply is taught by U.S. Patent Publication No. 2004/0236899 to Teicher, now U.S. Pat. No. 6,922,734, co-assigned with the present invention. U.S. Patent Publication No. 2004/0236899 is incorporated by reference for all purposes as if fully set forth herein. The aforementioned system includes a primary storage medium having a large capacity, a contactless secondary storage device for storing small amounts of data received wirelessly and a processor configured for copying data from the secondary storage device to the primary storage medium when the system is connected via a wired link to an appliance. Therefore, the aforementioned system overcomes one of the shortcomings of prior art systems by providing access to a large capacity primary storage medium without the need to have the primary storage medium connected via a wired link to a power supply.

As mentioned above, dual smart cards provide both contactless and contact interfaces for use in a wide variety of applications. Nevertheless, one of the main shortcomings of dual smart cards is that they are only able to transfer data via a wired link to an appliance if a specialized card reader is disposed between the smart card and the appliance.

Therefore, there is a need for a device having a contactless and contact interface for direct connection to an appliance without an intervening card reader.

SUMMARY OF THE INVENTION

The present invention is an integrated storage device construction and method of operation thereof.

According to the teachings of the present invention there is provided, an integrated storage device for transferring data between a remote base station and an appliance, comprising: (a) a non-volatile storage device configured for storing the data; (b) an antenna, configured for wirelessly: (i) receiving electrical energy from the remote base station in order to power the non-volatile storage device; and (ii) transferring the data between the remote base station and the non-volatile storage device; and (c) a processor arrangement permanently operationally connected to the non-volatile storage device, the processor arrangement being configured to manage data transfer between the non-volatile storage device and the appliance when the processor arrangement is electrically connected to a power supply via a wired power link.

According to a further feature of the present invention: (i) the power supply is a power supply for the appliance and (ii) the processor arrangement is configured for being reversibly electrically connected through the wired power link to the power supply.

According to a further feature of the present invention, the processor is disconnected from the power supply by disconnecting the processor from the appliance.

According to a further feature of the present invention, the processor is disconnected from the power supply by disconnecting the power supply from the appliance.

According to the teachings of the present invention there is also provided, an integrated storage device for transferring data between a remote base station and a computer system, comprising: (a) a non-volatile storage device configured for storing the data; (b) an antenna, configured for wirelessly: (i) receiving electrical energy from the remote base station in order to power the non-volatile storage device; and (ii) transferring the data between the remote base station and the non-volatile storage device; and (c) a processor arrangement permanently operationally connected to the non-volatile storage device, the processor arrangement being configured to manage data transfer between the non-volatile storage device and the computer system when the processor arrangement is electrically connected to the computer system via a USB port.

According to a further feature of the present invention, the processor arrangement is configured for being reversibly electrically connected to the computer system.

According to the teachings of the present invention there is also provided, a method for transferring data between a remote base station and an appliance using an integrated storage device having a processor and a non-volatile storage device, the processor being permanently operationally connected to the non-volatile storage device, the method comprising the steps of: (a) wirelessly receiving an electrical energy by the integrated storage device; (b) powering the non-volatile storage device using the electrical energy; (c) transferring the data wirelessly between the remote base station and the non-volatile storage device; (d) electrically connecting the integrated storage device to the appliance; (e) transferring the data between the non-volatile storage device and the processor; and (f) transferring the data between the processor and the appliance.

According to a further feature of the present invention, the step of electrically connecting is performed by reversibly electrically connecting the integrated storage device to the appliance.

According to a further feature of the present invention, the appliance is a computer system and wherein the step of electrically connecting is performed via a USB port.

According to a further feature of the present invention, there is also provided the step of at least partially configuring the appliance using the data.

According to a further feature of the present invention, there is also provided the step of physically packaging the integrated storage device, wherein the steps of transferring are performed after the step of packaging.

According to a further feature of the present invention, there is also provided the step of verifying the data, wherein the step of transferring data between the non-volatile storage device and the processor is: (i) performed by transferring data from the processor to the non-volatile storage device; and (ii) contingent on a positive result of the verifying.

According to a further feature of the present invention, the data includes personal credentials.

According to a further feature of the present invention, the data includes access rights.

According to a further feature of the present invention, the data includes stored value.

According to a further feature of the present invention, there is also provided the step of operationally connecting the integrated storage device to an appliance, the appliance being a camera.

According to a further feature of the present invention, there is also provided the step of operationally connecting the integrated storage device to an appliance, the appliance being a cellular telephone.

According to a further feature of the present invention, there is also provided the step of operationally connecting the integrated storage device to an appliance, the appliance being a personal processing system.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an integrated storage device construction and method of operation thereof.

The principles and operation of an integrated storage device according to the present invention may be better understood with reference to the drawings and the accompanying description.

Figure 1:
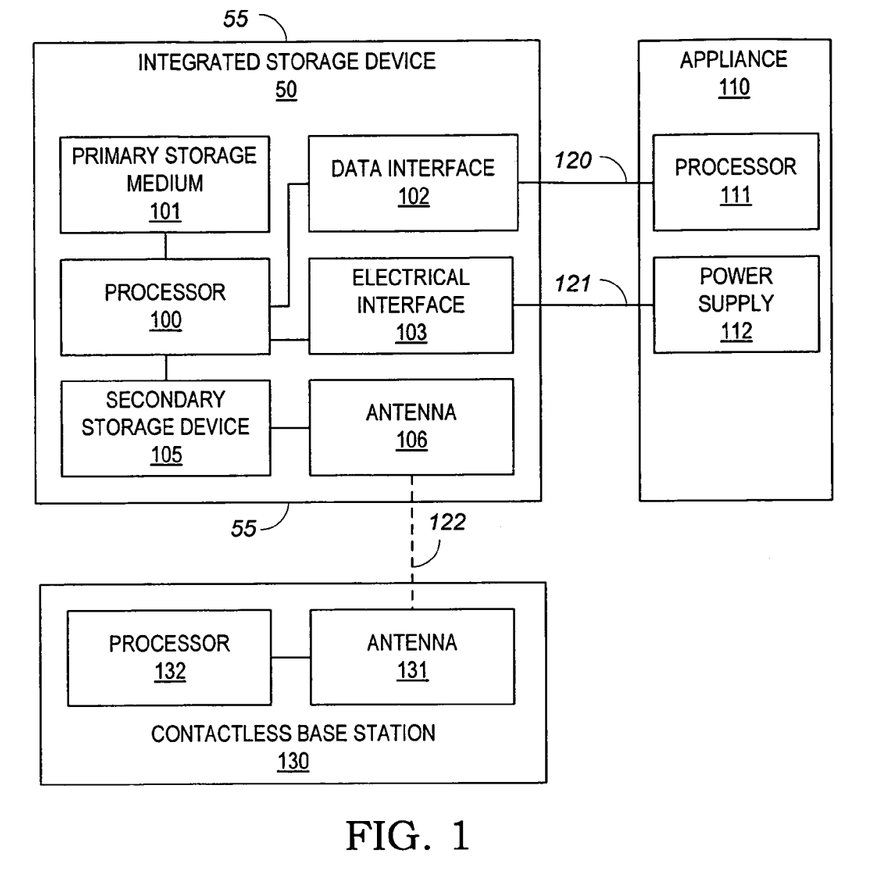
FIG. 1 is a schematic view of an integrated storage device that is constructed and operable in accordance with a preferred embodiment of the invention.

Reference is now made to FIG. 1, which is a high-level schematic block diagram of an integrated storage device 50 that is constructed and operable in accordance with a preferred embodiment of the invention. Integrated storage device 50 is configured for storing data received wirelessly from a remote contactless base station 130 or from an appliance 110. Integrated storage device 50 is also configured for transferring the stored data to appliance 110 or contactless base station 130. Integrated storage device 50 includes a primary storage medium 101. Primary storage medium 101 is only accessible for writing thereto or reading therefrom when primary storage medium 101 is electrically connected to a power supply, "electrically connected" being defined herein as connected using a non-wireless link. Primary storage medium 101 is a non-volatile storage medium, such as, a magnetic disk or flash memory. Primary storage medium 101 is configured to store relatively large amounts of data, typically in the megabyte to gigabyte range. The content of primary storage medium 101 may include user files, as well as system data, such as, device identification, device configuration parameters and security functions. It will be appreciated by those skilled in the art that all or part of primary storage medium 101 can be physically, electrically and logically protected against tampering, by techniques known in the art of smart cards.

Integrated storage device 50 includes a processor arrangement 100 which controls and manages access to primary storage medium 101. If primary storage medium 101 is a flash memory, processor arrangement 100 may also be configured to manage wear leveling, error correction, and security functions. Integrated storage device 50 also includes a data interface 102 which manages data exchange with a processor 111 of appliance 110 via a wired data link 120. Integrated storage device 50 includes an electrical interface 103 which receives electrical energy for operating processor arrangement 100 and primary storage medium 101 from a power supply 112 of appliance 110 via wired power link 121. Data link 120 and power link 121 are either permanent (for permanently connecting integrated storage device 50 and appliance 110) or temporary (for reversibly connecting integrated storage device 50 and appliance 110). It should be noted that integrated storage device 50 (and therefore processor arrangement 100 of integrated storage device 50) is typically reversibly electrically connected to power supply 112. Processor arrangement 100 is disconnected from power supply 112 either by disconnecting integrated storage device 50 from appliance 110 or by disconnecting power supply 112 from appliance 110. By way of a first example, when integrated storage device 50 is the memory of appliance 110, such as when appliance 110 is a cellular telephone, data link 120 and power link 121 are generally permanent. Therefore, integrated storage device 50 is disconnected from power supply 112 by removing the battery from appliance 110. By way of a second example, when integrated storage device 50 is a USB portable storage device connectable to appliance 110, such as when 110 is a personal computer, data link 120 and power link 121 are temporary. It should be noted that data link 120 and power link 121 are typically implemented using a single physical connector, for example a USB connector for connecting between USB ports of integrated storage device 50 and appliance 110. Appliance 110 is defined herein to include any electronic device that makes use of digital storage, such as a personal computer, cellular telephone, digital camera, PDA, or music player. Integrated storage device 50 also includes a secondary storage device 105 and an antenna 106. Contactless base station 130 has an antenna 131 and a processor 132. Contactless base station 130 is a contactless reader/writer. It will be appreciated by those ordinarily skilled in the art that contactless base station 130 can be configured using techniques known in the art of contactless smart cards and passive radio frequency identification (RFID) applications. Antenna 106 and antenna 131 define an electromagnetic link 122. Antenna 131 is capable of energizing secondary storage device 105 via antenna 106 as well as exchanging data with secondary storage device 105 via antenna 106. The typical operational distance between antenna 106 and antenna 131 is approximately in the range of several centimeters to a meter. Antenna 106 is configured to receive electrical energy from antenna 131 of contactless base station 130 in order to power secondary storage device 105, such that, secondary storage device 105 is accessible, for example, in order to store data. Therefore, secondary storage device 105 is accessible in order to store data thereon even when secondary storage device 105 is electrically disconnected from power supply 112. However, it will be appreciated by those skilled in the art that secondary storage device 105 is still accessible when secondary storage device 105 is electrically connected to power supply 112. Additionally, antenna 106 is configured to receive data wirelessly from processor 132 of contactless base station 130. Similarly, data is sent from secondary storage device 105 to processor 132 via electromagnetic link 122. Therefore, electromagnetic link 122 couples antenna 106 and antenna 131 to provide electrical energy to secondary storage device 105 as well as to allow data transfer between processor 132 and secondary storage device 105. The term "transferring data between" is defined herein to include transferring data between a first element and a second element, in both directions. In other words, transferring data from the first element to the second element and transferring data from the second element to the first element. For example, but not limited to transferring data from processor 132 to secondary storage device 105 and/or from secondary storage device 105 to processor 132. Secondary storage device 105 typically includes a small non-volatile memory and a controller (not shown). It will be apparent to those ordinarily skilled in the art that secondary storage device 105 and antenna 106 can be configured using techniques known in the art of contactless smart cards. The memory of secondary storage device 105 is preferably a low-power EEPROM, that is either physically separated from or integrated with primary storage medium 101. In accordance with a most preferred embodiment of the present invention, secondary storage device 105 includes non-storage functions performed by the controller of secondary storage device 105, such as, contactless identification, authentication and payment. These non-storage functions are known in the art of contactless smart cards.

The function of primary storage medium 101 and the interaction of primary storage medium 101 with the other elements of integrated storage device 50 are discussed with reference to U.S. Patent Publication No. 2004/0236899.

Processor arrangement 100 is configured for managing data transfer directly between secondary storage device 105 and appliance 110, when processor arrangement 100 is electrically connected to power supply 112 via power link 121, without using primary storage medium 101. It will be appreciated by those ordinarily skilled in the art that if integrated storage device 50 is only used for transferring data between contactless base station 130 and appliance 110 via secondary storage device 105 of integrated storage device 50, then primary storage medium 101 is not needed. Integrated storage device 50 includes a housing 55. Primary storage medium 101, secondary storage device 105 and processor arrangement 100 are disposed in housing 55. Primary storage medium 101, secondary storage device 105 and processor arrangement 100 are permanently operationally connected, such that, the connection between primary storage medium 101, secondary storage device 105 and processor arrangement 100 is not reversed during normal use of integrated storage device 50. For example, primary storage medium 101, secondary storage device 105 and processor arrangement 100 cannot be conveniently disconnected from each other without using tools.

Reference is now made to FIGS. 2a to 2d which describe various usage scenarios of integrated storage device 50.

Figure 2A:
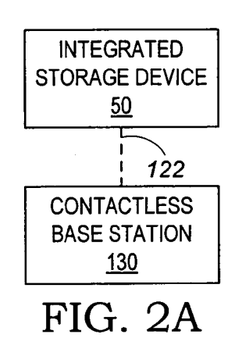
FIG. 2a is a schematic view of the integrated storage device of FIG. 1 which is in wireless contact with a contactless base station.

Reference is now made to FIG. 2a, which is a schematic view of integrated storage device 50 which is in wireless contact with contactless base station 130. Integrated storage device 50 is in proximity with contactless base station 130. Integrated storage device 50 and contactless base station 130 are electromagnetically coupled enabling data transfer between secondary storage device 105 (FIG. 1) and contactless base station 130.

Figure 2B:
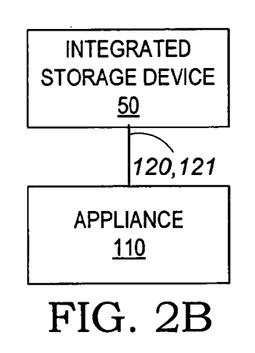
FIG. 2b is a high-level block diagram of the integrated storage device of FIG. 1 which is electrically connected to an appliance.
Figure 2C:
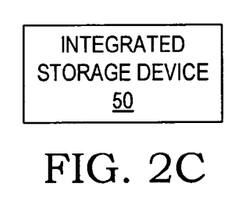
FIG. 2c is a schematic view of the integrated storage device of FIG. 1 which is not connected to any other device or appliance.

Reference is now made to FIG. 2b, which is a schematic view of integrated storage device 50 which is electrically connected to appliance 110. Power supply 112 (FIG. 1) of appliance 110 energizes processor arrangement 100 (FIG. 1) and secondary storage device 105, enabling transfer of data between secondary storage device 105 (FIG. 1) and appliance 110. It will be appreciated by those ordinarily skilled in the art that other transactions between processor arrangement 111 and secondary storage device 105 are also enabled. These other transactions are conventional and need not be described in detail here. Reference is also made to FIG. 2c, which is a schematic view of integrated storage device 50 which is not connected to any other device or appliance. In this scenario, integrated storage device 50 is disconnected from other devices. Therefore, the data stored in secondary storage device 105 (FIG. 1) cannot be read or changed.

Figure 2D:
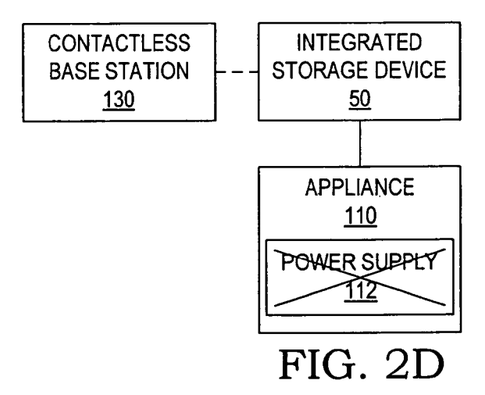
FIG. 2d is a schematic view of the integrated storage device of FIG. 1 which is in wireless contact with the remote contactless base station, the integrated storage device also being electrically connected to an appliance, the appliance not being connected to a power supply.

Reference is now made to FIG. 2d, which is a schematic view of integrated storage device 50 which is in wireless contact with contactless base station 130. In this scenario, integrated storage device 50 is also electrically connected to appliance 110. However, power supply 112 of appliance 110 is disconnected or not active. Therefore, the connection between appliance 110 and integrated storage device 50 is ineffective. Therefore, the scenario of this figure is functionally identical with the scenario of FIG. 2a. A realistic example of the scenario of this figure is a new cellular telephone that is still packaged within a box, with the battery of the cellular phone disconnected from the cellular phone. The present invention then allows some parameters, for example, operator identity, user name, telephone number and other credentials, to be updated in a secondary storage device of an integrated storage device of the telephone without opening the package, and only later, when the box is opened and the battery is connected to the telephone, the processor of the integrated storage device reads the configuration data for transferring to the processor of the telephone as necessary.

Figure 3:
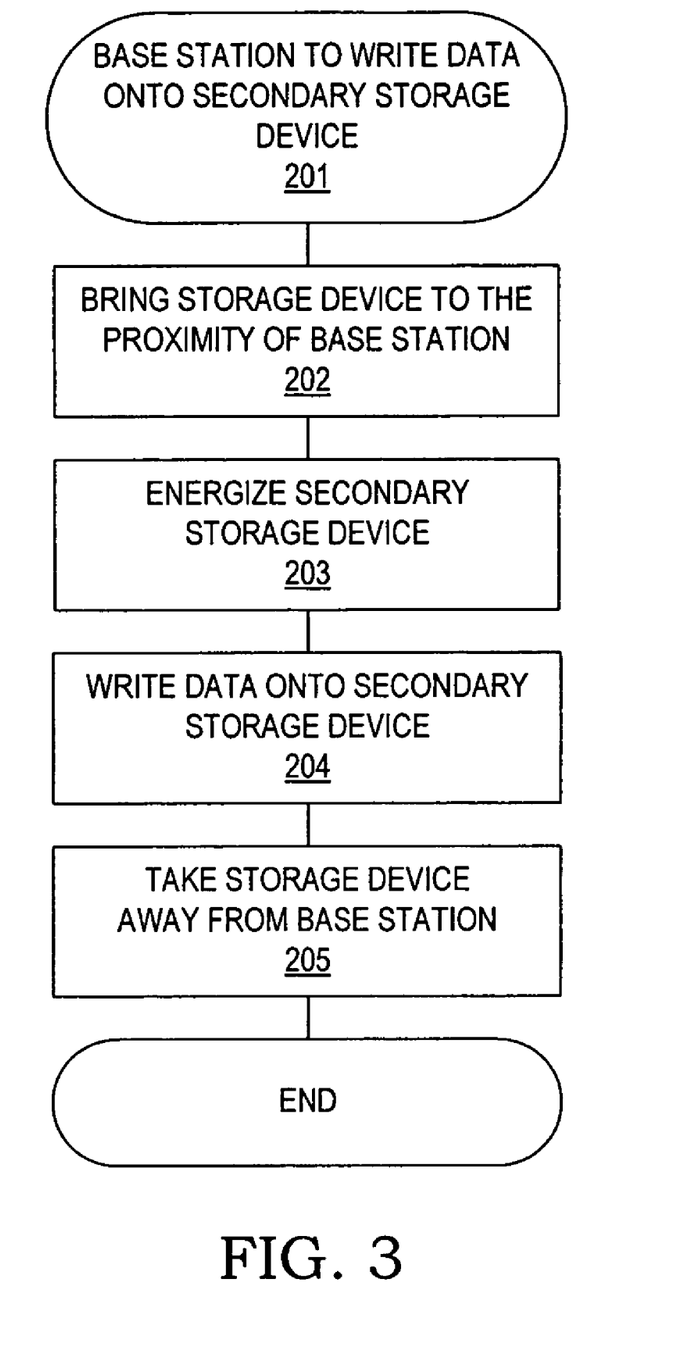
FIG. 3 is a flow chart of the steps of a method for transferring data from a contactless base station to a secondary storage device of the integrated storage device of FIG. 1.
Figure 4:
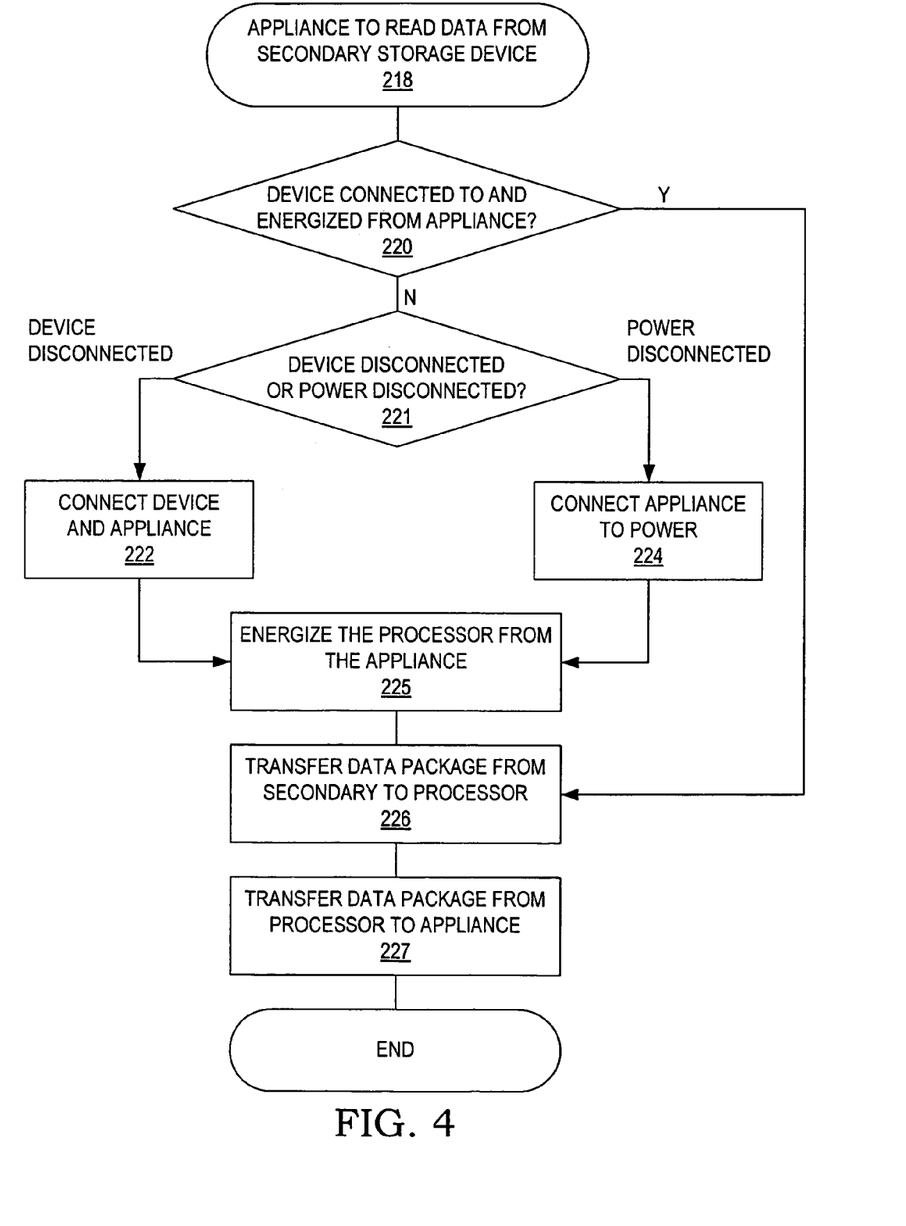
FIG. 4 is a flow chart of the steps of a method for transferring data from the integrated storage device of FIG. 1 to an appliance.
Figure 5:
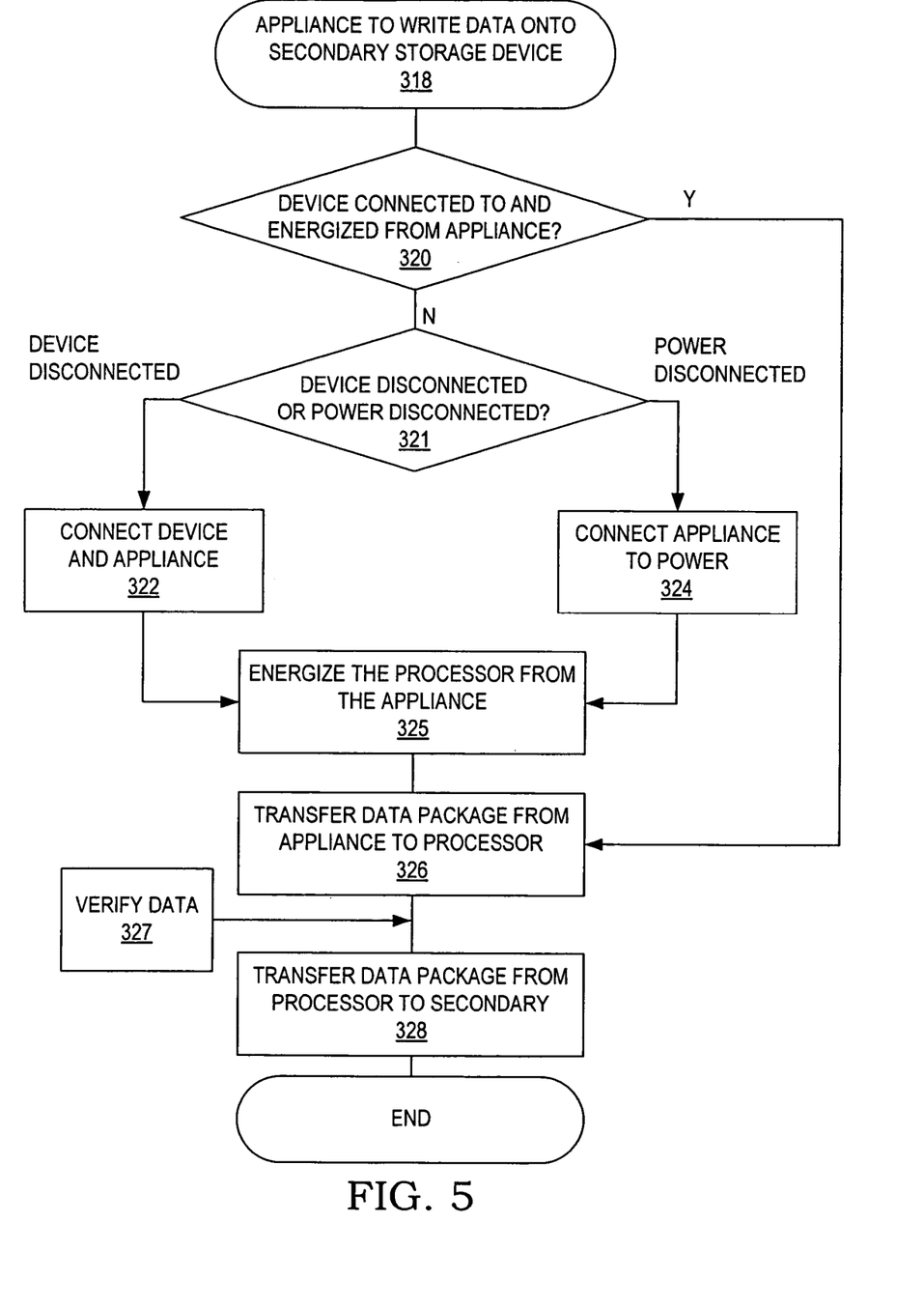
FIG. 5 is a flow chart of the steps of a method for transferring data from an appliance to the integrated storage device of FIG. 1.
Figure 6:
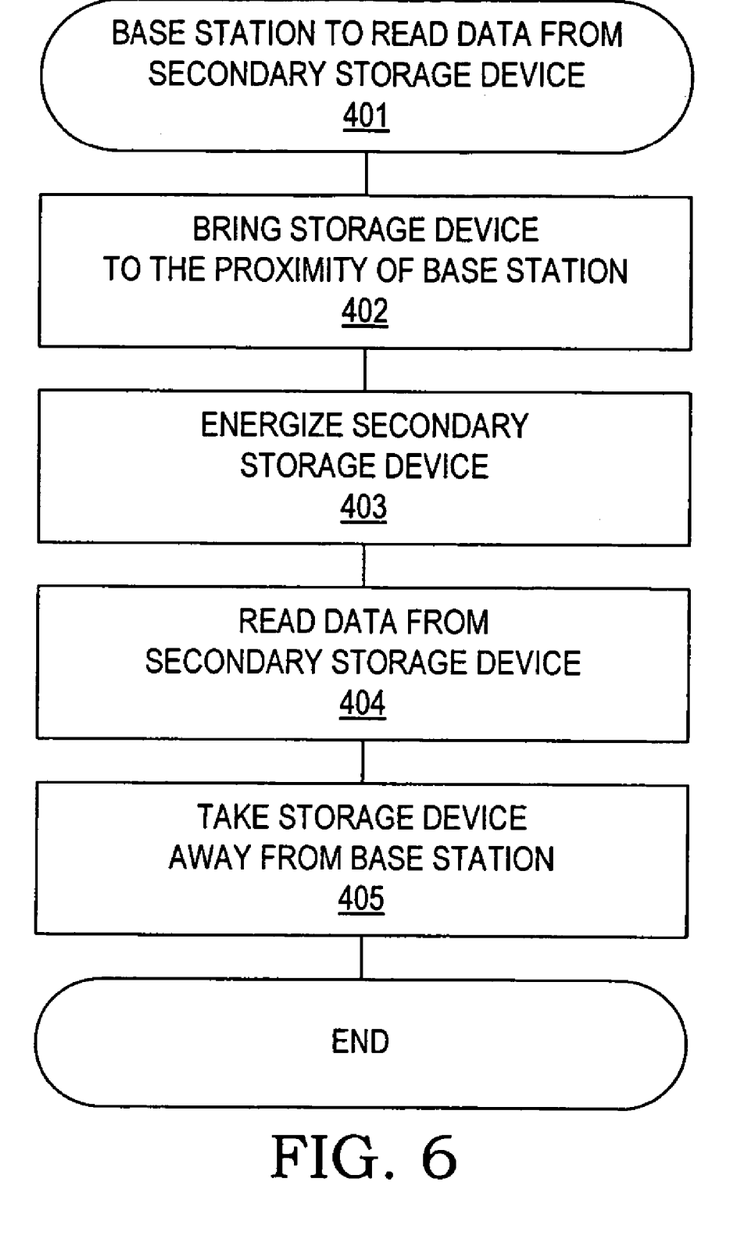
FIG. 6 is a flow chart of the steps of a method for transferring data from the integrated storage device of FIG. 1 to a contactless base station.

Reference is now made to FIGS. 3 to 6, which describe the operation of integrated storage device 50. FIGS. 3 and 4 describe transferring data from contactless base station 130 to appliance 110 via secondary storage device 105. FIGS. 5 and 6 describe transferring data from appliance 110 to contactless base station 130 via secondary storage device 105.

Reference is now made to FIG. 3, which is a flow chart of the steps of a method for transferring data from contactless base station 130 to secondary storage device 105 of integrated storage device 50 of FIG. 1. Reference is also made to FIG. 1. First, a decision is made to write data onto secondary storage device 105 by contactless base station 130 (block 201). Second, integrated storage device 50 is brought into the proximity of contactless base station 130, to enable electromagnetic coupling between antenna 106 and antenna 131 so that electrical energy is received via antenna 106 (block 202). If integrated storage device 50 is packaged within a non-metallic box, removal from the box may be unnecessary since electromagnetic coupling can penetrate such packaging. Third, secondary storage device 105 is powered using the electrical energy received via antenna 106 (block 203). Fourth, integrated storage device 50 receives data from processor 132 of contactless base station 130 via antenna 106. The data packages are then written to secondary storage device 105 (block 204). At this point, secondary storage device 105 is generally only powered by the electrical energy received via antenna 106 from contactless base station 130. Finally, integrated storage device 50 is removed from the proximity of contactless base station 130, thus disabling further communication between the two devices (block 205).

Reference is now made to FIG. 4, which is a flow chart of the steps of a method for transferring the data from secondary storage device 105 of integrated storage device 50 for reading by appliance 110 (block 218). Reference is also made to FIG. 1. Initially, the integrated storage device 50 is not energized ("N" branch of block 220) either because integrated storage device 50 is disconnected from appliance 110, or power supply 112 is disconnected from appliance 110. First, the connection status of integrated storage device 50 and appliance 110 is examined (block 221). By way of a first example, integrated storage device 50 and appliance 110 are typically operationally connected prior to this step when appliance 110 is a cellular telephone. By way of a second example, integrated storage device 50 and appliance 110 are sometimes operationally disconnected prior to this step when appliance 110 is a camera or personal processing system. A personal processing system is defined as a processor with a user interface having a keyboard and display device, for example, a personal computer system or a personal digital assistant (PDA). If integrated storage device 50 and appliance 110 are not connected then integrated storage device 50 is operationally connected, typically reversibly, to appliance 110 (block 222). If appliance 110 and power supply 112 are not connected then appliance 110 is connected to power supply 112 (Block 224) The scenario where integrated storage device 50, appliance 110 and power supply 112 are all disconnected from each other is not common and has therefore not been described. However, it will be apparent to those skilled in the art that integrated storage device 50, appliance 110 and power supply 112 would simply be connected together in such a scenario by performing both the step of block 222 and the step of block 224. The steps of blocks 222 and 224 electrically connect integrated storage device 50 and power supply 112 via power link 121, thereby energizing processor arrangement 100 and secondary storage device 105 (block 225). Next, processor arrangement 100 reads the data previously written to secondary storage device 105 (block 226). Processor arrangement 100 writes the data to appliance 110 via data link 120 (block 227). Processor arrangement 100 manages the data transfer and obviates the need for a special card interface between integrated storage device 50 and appliance 110. Finally, in an optional step, integrated storage device 50 is disconnected from appliance 110. However, integrated storage device 50 and appliance 110 may remain operationally connected to enable continued transactions between processor 111 and secondary storage device 105.

Examples of applications of the method of FIGS. 3 and 4 are described below.

The present invention lends itself to in-box setup. Often a storage device or a digital appliance requires customization and personalization after leaving the factory but before being operated by the end user of the device or appliance. The teachings of the present invention are applied as follows. First integrated storage device 50, possibly together with appliance 110, is packaged in a box. Second, data packages containing a configuration data set are sent from contactless base station 130 which is outside the box. The data packages are received by antenna 106. The data packages are then written to and stored in secondary storage device 105. When integrated storage device 50 is unboxed and electrically connected to a power supply by a user, the data packages are read from secondary storage device 105 by appliance 110 via processor arrangement 100, such that, appliance 110 is configured using the configuration data set.

By way of a first example, an institution equips each of its employees with a personal portable storage device, integrated storage device 50. Each integrated storage device 50 is configured, while still in its box, with the institution name and website address, employee name, access passwords and special credentials. All these configuration details are written, by applying the present invention, to secondary storage device 105 of integrated storage device 50 without opening the box. Appliance 110, typically a personal computer, reads configuration data, as required, from integrated storage device 50, when integrated storage device 50 is inserted into appliance 110 by the employee. By way of a second example, appliance 110 is a cellular telephone, which is configured at the operator's office, without opening its box, with the credentials of the operator and the user recorded onto secondary storage device 105. Appliance 110 reads configuration data from secondary storage device 105, as required, typically, when power supply 112, which is the battery of the cellular phone is connected to the cellular phone. In-box configuration will be appreciated by end-users who prefer receiving new devices sealed in their original package. Additionally, in-box configuration is much more efficient and economical to carry out in comparison to opening each and every box and physically connecting the device.

In a similar manner to that described with reference to FIGS. 3 and 4, data is transferred from appliance 110 to contactless base station 130 via secondary storage device 105 of integrated storage device 50. This is now described below with reference to FIGS. 5 and 6.

Reference is now made to FIG. 5, which is a flow chart of the steps of a method for transferring data from appliance 110 to secondary storage device 105 of integrated storage device 50 of FIG. 1. Reference is also made to FIG. 1. First, a decision is made for appliance 110 to write data to secondary storage device 105 (block 318). The steps of blocks 320 to 325 are substantially the same as the steps of blocks 220 to 225 described with reference to FIG. 4. Therefore, the steps of blocks 320 to 325 are not described further here. Next, data is transferred from appliance 110 to processor arrangement 100 via data link 120 (block 326). In case of sensitive data, the data is now verified by processor arrangement 100 or by the controller of secondary storage device 105 (block 327). The next step of transferring the data from processor arrangement 100 to secondary storage device 105 is contingent on a positive result of the verification of the data. Once the data is positively verified, processor arrangement 100 transfers the data to secondary storage device 105 (block 328). Processor arrangement 100 manages the data transfer and obviates the need for a special card interface between integrated storage device 50 and appliance 110.

Reference is now made to FIG. 6, which is a flow chart of the steps of a method for transferring data from secondary storage device 105 of integrated storage device 50 of FIG. 1 to contactless base station 130 (block 401). Reference is also made to FIG. 1. The steps of blocks 402 and 403 are substantially the same as the steps of blocks 202 to 203 described with reference to FIG. 4. Therefore, the steps of blocks 402 to 403 are not described further here. Next, data is transferred wirelessly from secondary storage device 105 to contactless base station 130 via electromagnetic link 122 (block 404). Finally, integrated storage device 50 is removed from the vicinity of contactless base station 130.

Examples of applications of the method of FIGS. 5 and 6 are described below. Integrated storage device 50 is personalized by recording user credentials, recording access rights or recording stored value for payment (in other words, re-charging an electronic purse). These three application are now described in more detail. When appliance 110 is a personal processing system, such as a personal computer, integrated storage device 50 is connected to appliance 110 via a USB connection. Personal credentials, access rights or stored value is downloaded from the Internet by appliance 110. The personal credentials, access rights or stored value, is then transferred to secondary storage device 105 of integrated storage device 50. The transferred personal credentials, access rights or stored value, customizes, personalizes or refills the functionality of integrated storage device 50, respectively. Optionally, an authentication process is included that involves any combination of processor 111, processor arrangement 100 and the controller of secondary storage device 105, as well as the receipt of a PIN from the user. The received personal credentials, access rights or stored value are then recorded onto secondary storage device 105 ready to be used wirelessly between contactless base station 130 and integrated storage device 50 for the respective transactions.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. An integrated storage device comprising:
   (a) an electrical interface for a wired power link
   (b) a non-volatile storage device;
   (c) a non-volatile storage medium, separate from said non-volatile storage device, that is powered only via said electrical interface;
   (d) an antenna, configured for wirelessly:
      (i) receiving electrical energy from a remote base station in order to power said non-volatile storage device; and
      (ii) transferring data between said remote base station and said non-volatile storage device;
   (e) a processor arrangement permanently operationally connected to said non-volatile storage device, said processor arrangement being configured to manage data transfer between said non-volatile storage device and an appliance when said processor arrangement is electrically connected to a power supply via said electrical interface and said wired power link; and
   (f) a housing that encloses at least said non-volatile storage device, said non-volatile storage medium and said processor arrangement.

2. The integrated storage device of claim 1, wherein:
   (i) said power supply is a power supply for said appliance; and
   (ii) said processor arrangement is configured for being reversibly electrically connected through said wired power link to said power supply.

3. The integrated storage device of claim 2, wherein said processor is disconnected from said power supply by disconnecting said processor from said appliance.

4. The integrated storage device of claim 2, wherein said processor is disconnected from said power supply by disconnecting said power supply from said appliance.

5. An integrated storage device comprising:
(a) an electrical interface for a wired power link
(b) a non-volatile storage device;
(c) a non-volatile storage medium, separate from said non-volatile storage device, that is powered only via said electrical interface;
(d) an antenna, configured for wirelessly:
  (i) receiving electrical energy from a remote base station in order to power said non-volatile storage device; and
  (ii) transferring data between said remote base station and said non-volatile storage device;
(e) a processor arrangement permanently operationally connected to said non-volatile storage device, said processor arrangement being configured for being reversibly electrically connected to a computer system, said processor arrangement being configured to manage data transfer between said non-volatile storage device and said computer system when said processor arrangement is reversibly electrically connected to said computer system via said electrical interface and said wired power link.

6. The integrated storage device of claim 5, wherein said electrical interface is a USB port.

7. A method for transferring data between a remote base station and an appliance comprising the steps of:
(a) providing an integrated storage device that includes:
  (i) an electrical interface for a wired power link,
  (ii) a non-volatile storage medium that is powered only via said electrical interface,
  (iii) a non-volatile storage device that is separate from said non-volatile storage medium,
  (iv) a processor that is permanently operationally connected to said non-volatile storage device and to said non-volatile storage medium, and
  (v) a housing that encloses at least said processor, said non-volatile storage device and said non-volatile medium:
(b) wirelessly receiving an electrical energy by said integrated storage device;
(c) powering said non-volatile storage device using said electrical energy;
(d) transferring the data wirelessly between the remote base station and said non-volatile storage device;
(e) electrically connecting said integrated storage device to the appliance via said electrical interface and said wired power link;
(f) transferring the data between said non-volatile storage device and said processor; and
(g) transferring at least a first portion of the data between said processor and the appliance.

8. The method of claim 7, wherein said step of electrically connecting is performed by reversibly electrically connecting said integrated storage device to the appliance.

9. The method of claim 7, wherein the appliance is a computer system and wherein said step of electrically connecting is performed via a USB port.

10. The method of claim 7, further comprising the step of:
(g) at least partially configuring the appliance using the data.

11. The method of claim 10, further comprising the step of:
(h) physically packaging said integrated storage device, wherein said steps of transferring are performed after said step of packaging.

12. The method of claim 7, further comprising the step of:
(g) verifying the data, wherein said step of transferring data between said non-volatile storage device and said processor is:
  (i) performed by transferring data from said processor to said non-volatile storage device; and
  (ii) contingent on a positive result of said verifying.

13. The method of claim 7, wherein the data includes personal credentials.

14. The method of claim 7, wherein the data includes access rights.

15. The method of claim 7, wherein the data includes stored value.

16. The method of claim 11, wherein said integrated storage device and the appliance are physically packaged together in a common package.

17. The method of claim 7, further comprising the step of:
(h) transferring at least a second portion of the data between said processor and said non-volatile storage medium using electrical power received via said wired power link.

18. The integrated storage device of claim 1, wherein said processor arrangement is configured to control said non-volatile storage medium and to manage access to said non-volatile storage medium.

19. The integrated storage device of claim 1, wherein said transfer of said data between said remote base station and said non-volatile storage device is independent of said processor arrangement.

20. The integrated storage device of claim 5, wherein said processor arrangement is configured to control said non-volatile storage medium and to manage access to said non-volatile storage medium.

21. The integrated storage device of claim 5, wherein said transfer of said data between said remote base station and said non-volatile storage device is independent of said processor arrangement.

22. The method of claim 7, wherein said transferring of the data between the remote base station and said non-volatile storage device is effected independently of said processor.

* * * * *

UNITED STATES PATENT AND TRADEMARK OFFICE
CERTIFICATE OF CORRECTION

| | | |
|---|---|---|
| PATENT NO. | : 7,136,937 B2 | Page 1 of 1 |
| APPLICATION NO. | : 11/053881 | |
| DATED | : November 14, 2006 | |
| INVENTOR(S) | : Teicher | |

It is certified that error appears in the above-identified patent and that said Letters Patent is hereby corrected as shown below:

Title page
Item [73]
Assignee: Delete "m systems Ltd." should be changed to Insert --msystems Ltd.--

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,136,937 B2  Page 1 of 1
APPLICATION NO. : 11/053881
DATED : November 14, 2006
INVENTOR(S) : Teicher

It is certified that error appears in the above-identified patent and that said Letters Patent is hereby corrected as shown below:

On title page item [73]

Assignee: "m systems Ltd." should be changed to --msystems Ltd.--

Signed and Sealed this

Twentieth Day of March, 2007

JON W. DUDAS
*Director of the United States Patent and Trademark Office*